United States Patent [19]

Gregory

[11] Patent Number: 5,455,558

[45] Date of Patent: Oct. 3, 1995

[54] AUTOMOTIVE TURN SIGNAL ALERT DEVICE

[76] Inventor: Albert P. Gregory, 27211 Pico La., Sun City, Calif. 92586

[21] Appl. No.: 56,312

[22] Filed: Apr. 30, 1993

Related U.S. Application Data

[63] Continuation-in-part of Ser. No. 787,573, Nov. 4, 1991, abandoned, which is a continuation-in-part of Ser. No. 488,291, Mar. 5, 1990, abandoned.

[51] Int. Cl.⁶ ........................................................ B60Q 1/26
[52] U.S. Cl. .............................. 340/474; 340/475; 340/477
[58] Field of Search ..................................... 340/474, 475, 340/477; 364/424.01, 424.05; 381/86

[56] References Cited

U.S. PATENT DOCUMENTS

| | | | |
|---|---|---|---|
| 2,896,190 | 7/1959 | Gallaro et al. | 340/474 |
| 3,289,158 | 11/1966 | Olson | 340/474 |
| 3,315,226 | 4/1967 | Fernekes | 340/474 |
| 3,786,498 | 1/1974 | Lipe et al. | 340/474 |
| 4,306,218 | 12/1981 | Leconte et al. | 340/474 |
| 4,924,208 | 5/1990 | Goughlin | 340/474 |
| 5,099,222 | 3/1992 | Campagna | 340/474 |
| 5,218,340 | 6/1993 | Shannon, Jr. et al. | 340/474 |
| 5,309,143 | 5/1994 | Brown et al. | 340/474 |

*Primary Examiner*—Donnie L. Crosland
*Attorney, Agent, or Firm*—John J. Connors; Connors & Associates

[57] ABSTRACT

A turn signal alert device adapted to be easily retrofitted on an automobile which provides an audio signal when the turn signal indicator of an automobile is activated. This device includes a time delay element which delays turning on the audio signal for a predetermined time period after the turn signal indicator has been activated. A wafer-like connector couples the device across the flasher relay of the turn signal indicator, with the prongs of the flasher relay being inserted into openings in the connector with conductive elements at the openings to make electrical contact with the prongs. The device includes an audio element which is connected electrically across the flasher relay to one side of the battery power supply and the other side of the battery power supply through the filament of a light bulb in the turn signal indicator. A delay means provides a predetermined time period between a series of audio alert signals until the manually activated switch is deactivated. Another device is installed as original equipment on the automobile. This device utilizes a conventional microprocessor normally present and connected to an audio element normally present.

11 Claims, 11 Drawing Sheets

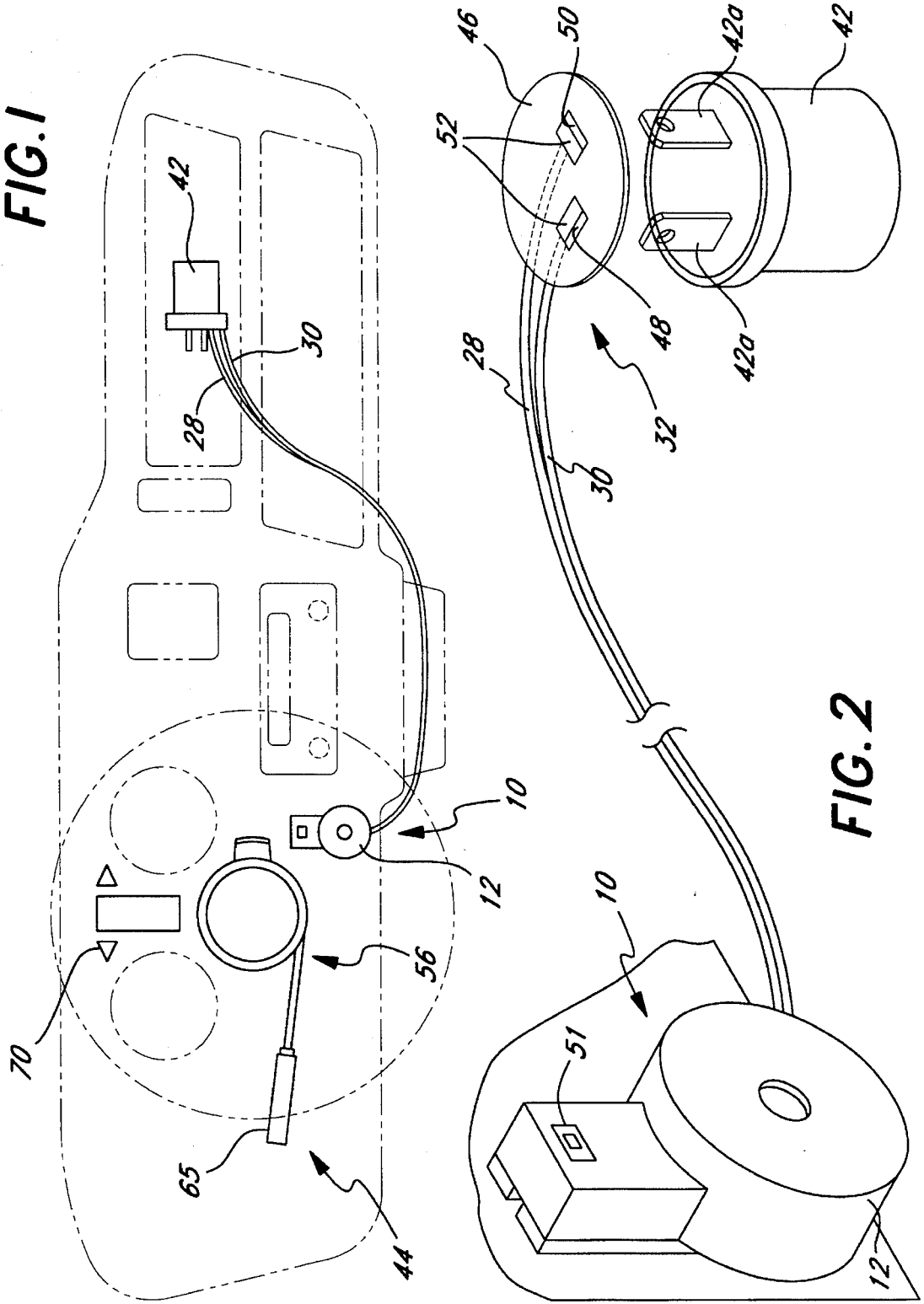

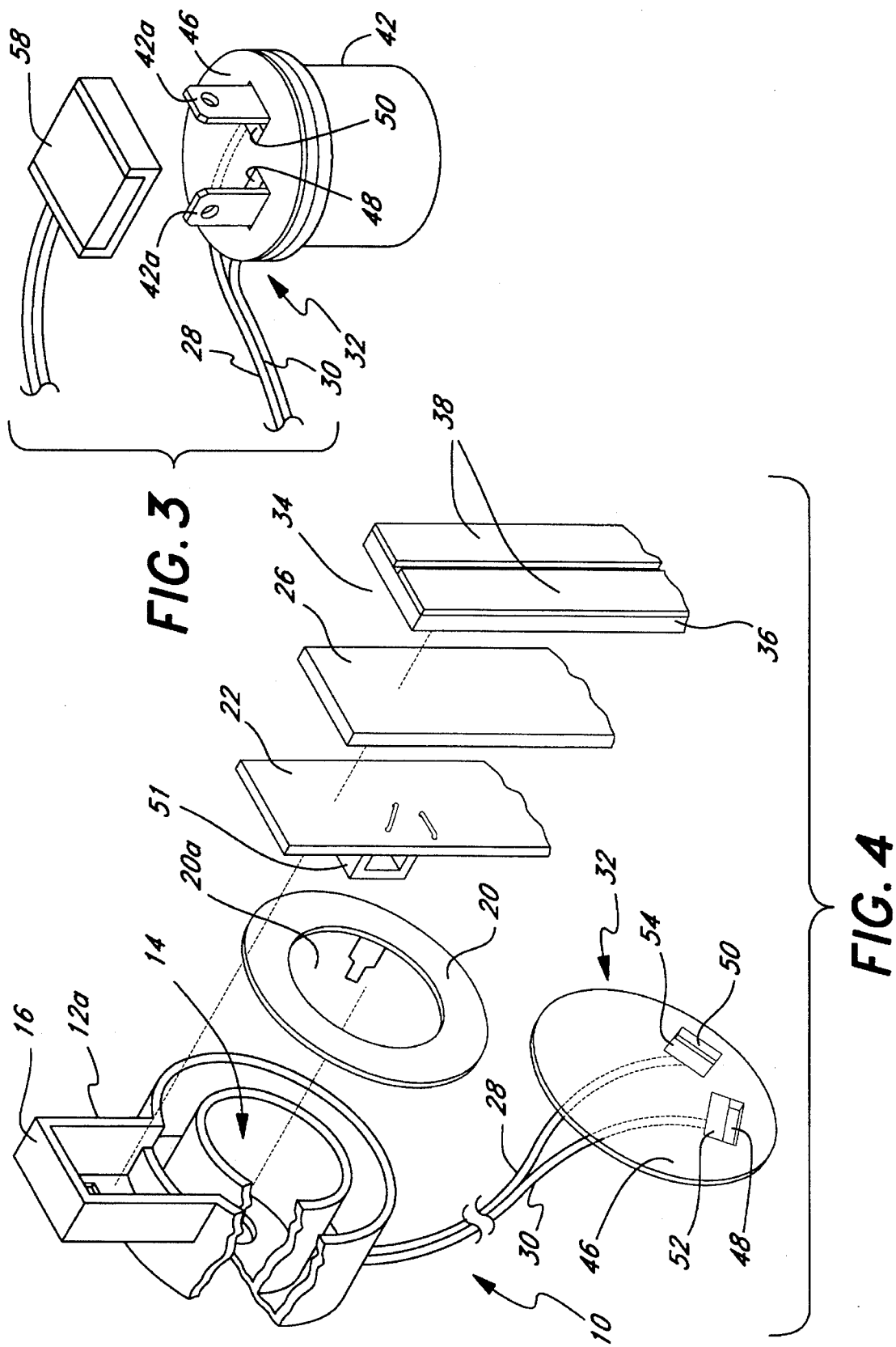

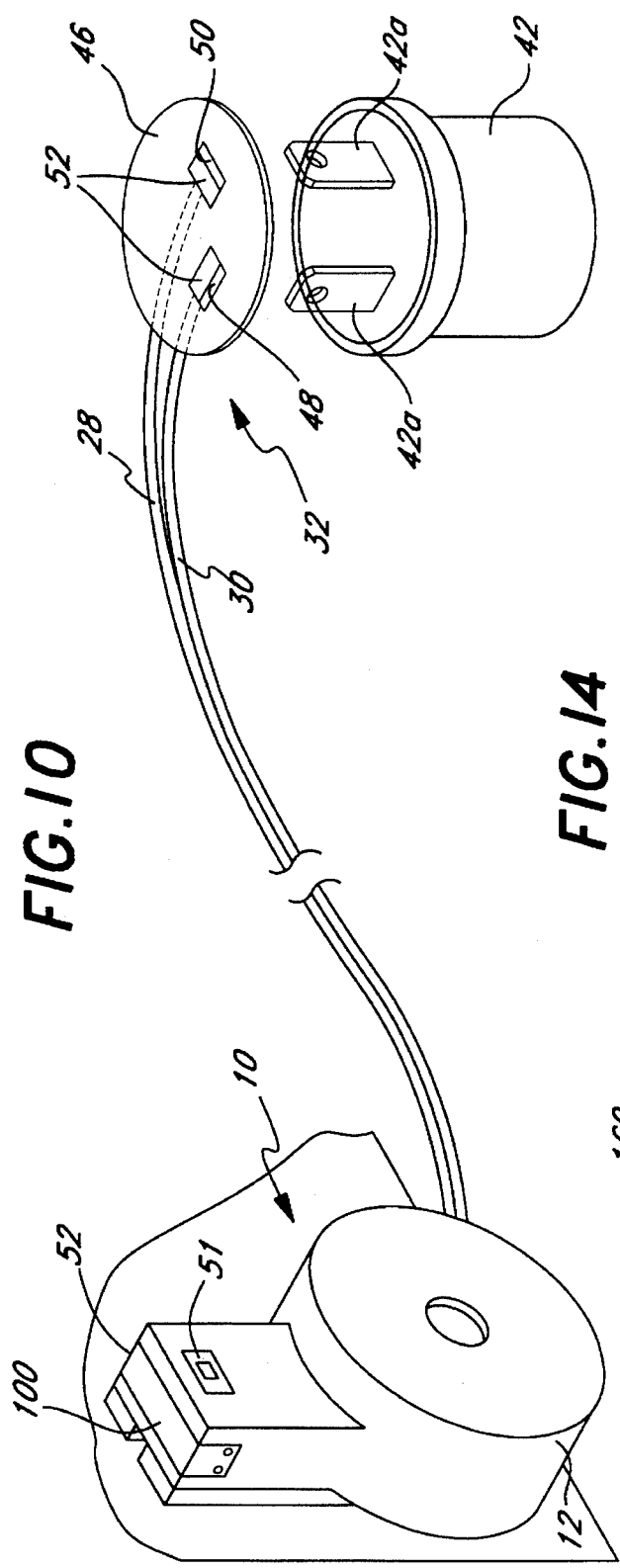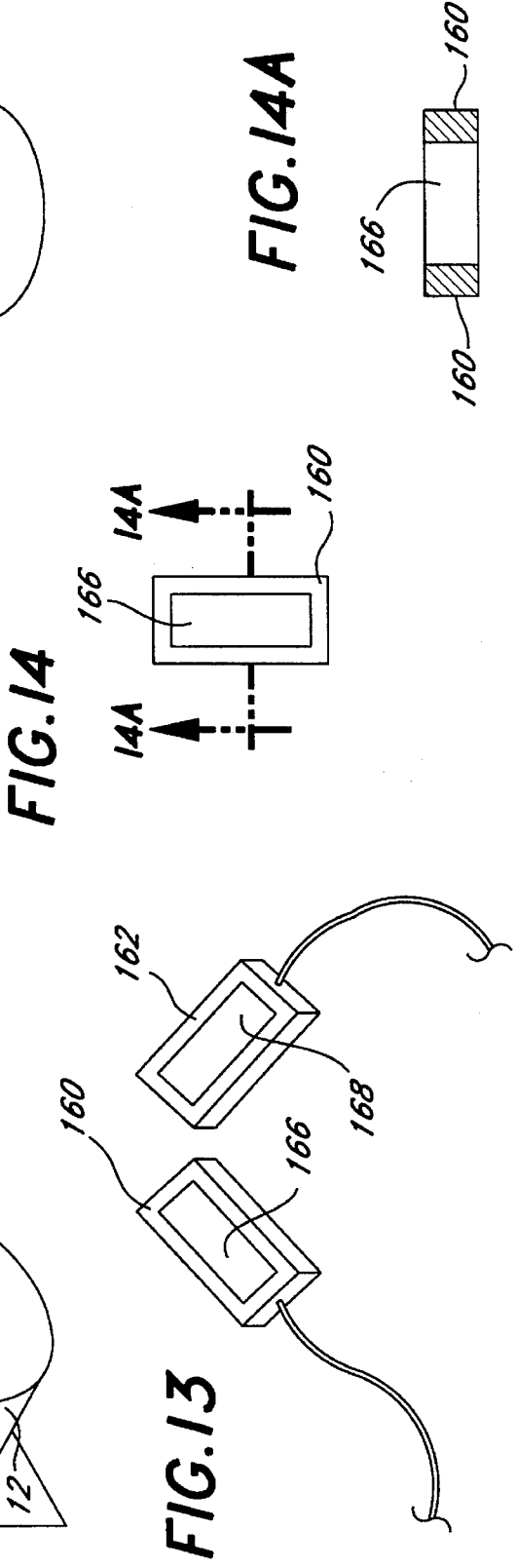

5,455,558

AUTOMOTIVE TURN SIGNAL ALERT DEVICE

RELATED PATENT APPLICATION

This patent application is a continuation-in-part of the U.S. Pat. application Ser. No. 07/787,573, entitled "Automotive Turn Signal Alert Device", filed Nov. 4, 1991, now abandoned which in turn is a continuation-in-part of U.S. patent application Ser. No. 07/488,291, filed Mar. 5, 1990, and entitled, "Automotive Turn Signal Alert Device," now abandoned. These prior related applications are incorporated herein by reference and made a part of this application.

BACKGROUND OF THE INVENTION

1. Field of the Invention

This invention relates to a device which indicates when the turn signal indicator of an automobile is activated, and particularly, such a device which gives an audio alert signal to the driver of the automobile when the turn signal indicator is activated.

2. Background Discussion

Most automobiles are equipped with turn signal indicators which are manually actuated by the driver pressing a lever next to the steering wheel either up or down to turn on a right or left turn signal indicator, depending on the maneuver the driver intends to make. The conventional turn signal indicators that are standard on most automobiles include lights on the dash board which blink on and off when the turn signal indicator has been actuated. When the driver makes a wide turn, a mechanical control device automatically deactivates the turn signal indicator.

The problem with these conventional devices, however, is that the turn must be sufficiently wide for the mechanical control device to deactivate the turn signal indicator. If the driver only makes a shallow angle turn, for example, when switching lanes on a highway, the mechanical device does not automatically deactivate the turn signal indicator. Consequently, if the driver does not notice the light blinking on the dash board, he travels down the highway with his turn signal indicator flashing on and off, even though he is not about to make a turning maneuver. This not only annoys other motorists who are following the driver, but can result in an accident by giving other motorists inaccurate information about the intentions of the driver.

SUMMARY OF THE INVENTION

It is the objective of the present invention to overcome this problem by providing an inexpensive, easy to install device which provides an audio signal when the turn signal indicator is activated. In one embodiment, the device of this invention may be retrofitted on conventional turn signal indicators by connecting it to the flasher relay, which is a standard component utilized in essentially all automotive turn signal indicators. In another embodiment, the invention may be installed as original equipment on the automobile.

The turn signal alert device of this invention has several features, no single one of which is solely responsible for its desirable attributes. Without limiting the scope of this invention as expressed by the claims, its more prominent features will now be discussed briefly. After considering this discussion, and particularly after reading the section of this application entitled "DETAILED DESCRIPTION OF THE PREFERRED EMBODIMENTS," one will understand how the features of this invention provide its advantages.

The first feature of this invention is that it provides an audio element which is connected in a circuit which is coupled by connector means across the flasher relay. The flasher relay conventionally used has normally closed contacts which are integral with a heater element or a magnetic armature. When current passes through the heater element or the magnetic armature is activated, the contacts open, breaking the circuit to turn off the turn signal indicator light bulbs. The heater element or the magnetic armature is no longer energized and after a few milliseconds, the contacts close again to turn on the light bulbs. Current thus flows from the battery of the automobile through the relay and filament of the light bulbs to complete a circuit between the positive and negative terminals of the battery. In accordance with this invention, the audio element is connected across the relay and is energized when the contacts are open, allowing current to flow from one terminal of the battery through the audio element and through a circuit, including the filaments of the light bulbs, back to the other terminal of the battery. As current flows through the audio element, sound is generated. When the contacts are again closed, the sound is discontinued. This produces a rapid beeping sound.

The second feature of this invention is that a unique connector is employed to connect the audio element across the flasher relay. This connector means includes a thin insulating material, for example, about 1/64 of an inch thick, of an insulating material made, for example, from phenolic resin. This thin, wafer-like element has a number of openings in it corresponding to the number of prongs in the flasher relay. These prongs pass through the openings in the connector. There are conductive elements at the openings which make contact with the prongs. These conductive elements are in circuit with the audio element.

The third feature of this invention is that the device has two modes of operation. The first mode is the audio active mode. The second mode is the delay mode. There is a switch which is manually activated by the driver to switch between the two modes. When in the audio-active mode, the audio element is immediately energized as soon as the turn signal indicator switch is manually moved to indicate a right or a left turn. In the delay mode, the audio element is energized only after a predetermined time period (for example, 45 seconds to one minute) after moving the switch in the turn signal indicator to a left or right position. Preferably, the volume of the audio signal increases from a low to a high volume gradually over time.

The fourth feature of this invention is that the device includes a relatively small housing which holds the audio element and also the circuit board containing the various electronic components of a circuit to control activation of the audio element. On the exterior of the housing are means to secure the housing to, for example, the dash board at a position near the flasher relay to allow the connector to be electrically connected to the relay. The conductive elements include leads which extend into the housing from the wafer member to allow the wafer-like element to be connected to the flasher relay by simply pulling the flasher relay from its terminals, placing the prongs of the relay into the openings in the wafer-like element, and then reinserting the prongs into the terminals of the flasher relay.

The fifth feature of this invention is that it may be installed as original equipment with the automobile. In this case, the need for the wafer-like element and audio circuitry used with the retrofit device is eliminated. All that is required is that appropriate electrical inputs be connected to one of the microprocessors commonly employed and installed with the original equipment. When the turn signal indicator is activated, an input signal is generated which sets the microprocessor to turn on a transducer that activates a sound generator normally present to provide an audio alert signal. When this input signal is not present, the microprocessor is set to turn off the transducer. Other inputs would control audio time delay and amplitude.

The sixth feature of this invention is a reset switch which allows the user to reset manually the device to momentarily shut off the alert signal for a predetermined interval.

The seventh feature of this invention is an automatic time delay for the alert signal, so that a predetermined time interval elapses between a series of alert signals.

The eighth feature of this invention is the use of eyelid type connectors for connecting the device to the flasher relay.

The ninth feature of this invention is a combined relay and audio alert signal device for an automotive vehicle. This device includes a housing with connector elements, or prongs, that enable the device to plug into a conventional receptacle in the circuitry for the flashing turn signal lights. The circuitry includes a typical manually activated switch which is closed to indicate turning of the automotive vehicle by activation of flashing lights and a battery terminal of a battery which provides electrical power to the flashing lights. Mounted within the housing is an audio element, a solid state power switch for controlling the flashing of the lights, and an electronic control circuit for the audio element and said solid state power switch. The control circuit, when the switch is activated, turns the relay on and off and turns on the audio element after a predetermined time delay.

DESCRIPTION OF THE DRAWING

The preferred embodiments of this invention illustrating all its features will now be discussed in detail. These embodiments depict the novel and non-obvious turn signal alert device of this invention. The drawing accompanying this application, which is for illustrative purposes only, includes the following FIGS., with like numerals indicating like parts:

FIG. 1 is a front elevational view of a dash board of an automobile with the turn signal alert device of this invention mounted on the dash board.

FIG. 2 is a perspective view of the turn signal alert device of this invention, with the wafer-like element positioned to be connected to the flasher relay of a conventional turn signal indicator.

FIG. 3 is a perspective view showing the wafer-like element connected to the flasher relay which is about to be connected to its terminals.

FIG. 4 is an exploded perspective view of the turn signal alert device of this invention.

FIG. 10 is a perspective view of an alternate embodiment of the turn signal alert device of this invention similar to that of FIG. 2 showing the manually actuated reset switch depicted in FIG. 9.

FIG. 13 is a schematic drawing illustrating eye-lid type connectors to be used in place of the wafer connector shown in FIG. 2.

FIG. 14 is a plan view of one of the eye lid connectors shown in FIG. 13.

FIG. 14A is a cross-sectional view taken along line 14A–14A of FIG. 14.

DESCRIPTION OF THE PREFERRED EMBODIMENTS OF THE INVENTION

FIRST EMBODIMENT OF THE INVENTION

Figure 5:
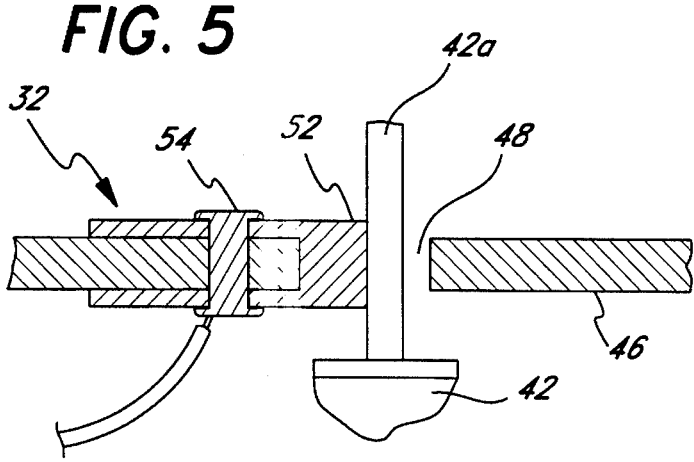
FIG. 5 is a fragmented, cross-sectional view of the wafer-like element showing a prong of the flasher relay in electrical contact with one of the conductive elements.

As best illustrated in FIG. 4, the turn signal alert device 10 of this invention includes a housing 12 made of a plastic injection molded material which has a generally cylindrical acoustic chamber 14 and a box-like section 16 extending outwardly therefrom. In the interior of the acoustic chamber 14 is a cylindrical wall 18. A piezoelectric transducer 20, including a membrane 20a, is the audio element. The membrane 20a rests on the edge 18a of the cylindrical wall 18. This membrane 20a, when electrically actuated, vibrates to generate sound. There is a node established in the membrane 20a having a circular configuration corresponding in diameter to the edge 18a. A flexible adhesive is applied to the edge 18a to hold the transducer 20 in position. A circuit board 22 is used to carry the various components of the circuit 24 shown in FIG. 7. With the board 22 covering the transducer 20, and both seated inside the housing 12, a cover 26 is secured in position over the open side of the housing 12, for example, by applying an adhesive to the edge 12a of the housing which bonds the cover to the housing 12. Through an opening (not shown) in the housing 12 there extends outwardly electrical leads 28 and 30 which are connected to a wafer-like connector 32.

Figure 6:
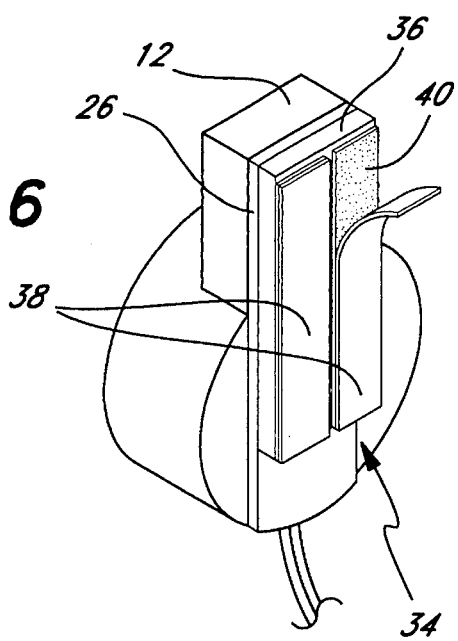
FIG. 6 is a perspective view showing the back side of the housing of the turn signal alert device of this invention.

As illustrated in FIG. 6, the cover 26 has on its exterior surface an adhesive strip 34 comprising a foam layer 36 which has paper sheets 38 covering an adhesive surface 40. As depicted in FIGS. 1 and 6, upon removal of the paper sheets 38, the adhesive surface 40 is exposed, allowing the housing 12 to be secured in a position near a flasher relay 42 for the turn signal indicator by simply pressing the adhesive surface against the dash board 44. The flasher relay 42 is a conventional electrical component and usually has two or three prongs 42a extending outwardly from the flasher relay.

Figure 7:
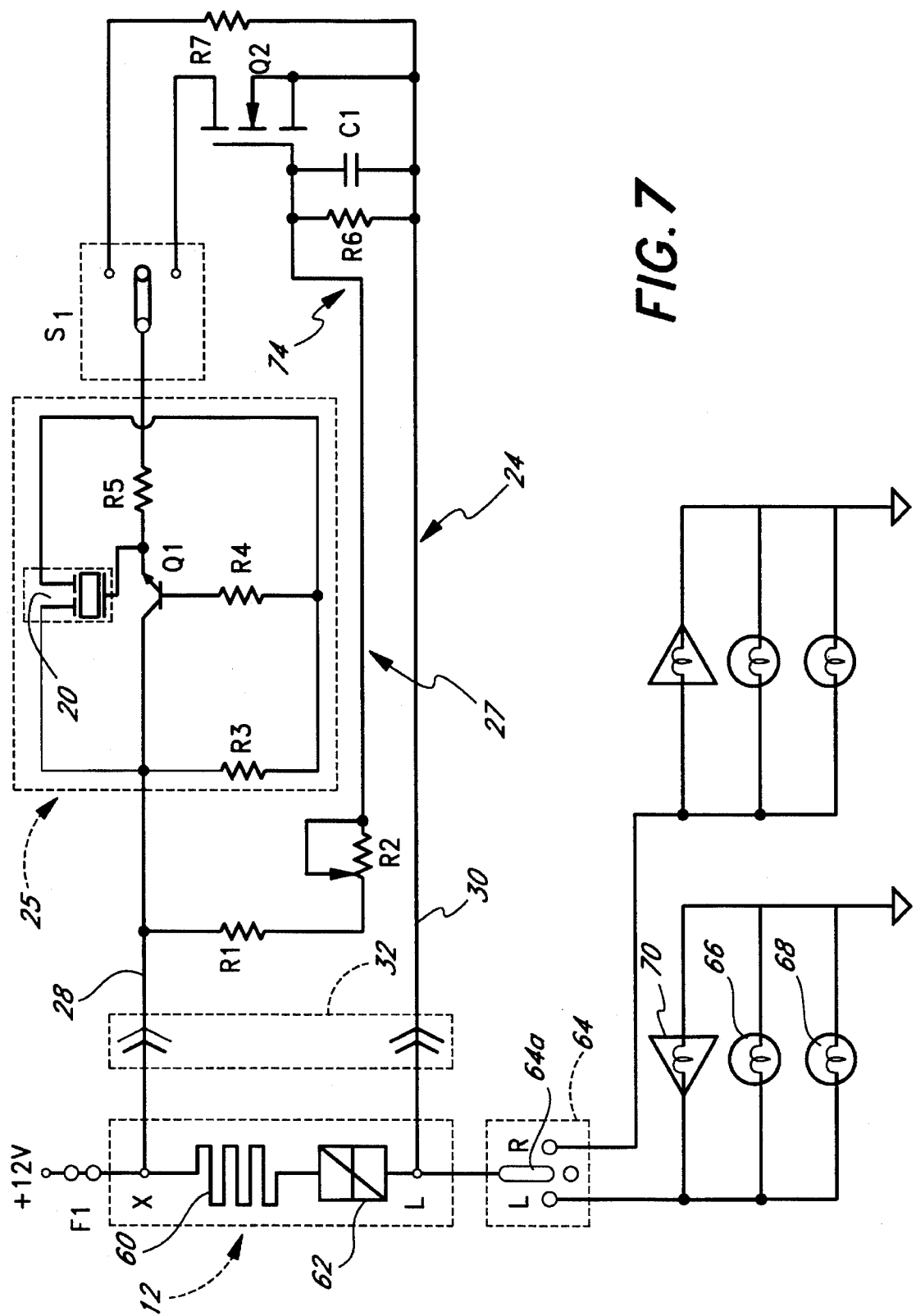
FIG. 7 is a schematic circuit diagram showing the circuitry for the turn signal device of this invention and how it is connected to control circuitry of a conventional turn signal indicator.

The wafer-like connector 32 includes a thin plate 46 of insulating material made of phenolic resin. The plate 46 has a pair of holes or slots 48 and 50 therein which correspond in size and position to the prongs 42a. Adjacent each slot 48 and 50, is a sheet-type metallic conductor member 52 which wraps around the edge of an adjacent slot. A rivet 54 for each conductive member 52 holds the conductive members in position. The conductive members 52 are designed so that the metallic surface of these members press snugly against the prongs 42a of the relay 42 when the relay is inserted into the slots 48 and 50. The leads 28 and 30 extend outwardly from the conductive members 52 and are connected across the relay element 42 as schematically illustrated in FIG. 7. Thus, to connect the device 10 to an automotive turn signal indicator 56, all that needs to be done is to pull the relay 42 from its receptacle 58 (FIG. 3) in which the prongs 42a are received, insert the prongs into the slots 48 and 50 in the wafer-like connector 32, and then plug the prongs back into the receptacle.

As depicted in FIG. 7, the turn signal indicator 56 includes a battery (not shown) having its positive terminal connected through a fuse F1 to the X prong (one of the flasher relay prongs 42a being designated X and the other L) of the flasher relay 42. The flasher relay 42, including a heater 60 and normally closed contacts 62, is then connected through the L prong to the turn signal switch 64. This switch 64 is attached to a handle 65 (FIG. 1) adjacent the steering wheel. By pushing the handle 65, for example, down, the switch arm 64a is moved from the off position to the L position to turn on the front left light 66 and rear left light 68 of the turn signal indicator 64 and the left panel light 70 on the dashboard 44. As current flows through the heater 60, the temperature is raised to open the normally closed contacts 62. This breaks the circuit, preventing current to flow through the filaments of the light bulbs to the negative terminal of the battery, shutting off the lights 66, 68, and 70. The heater cools down because current is no longer flowing through it, allowing the contacts to close again to again turn on the lights 66, 68, and 70. Thus, the left front and rear lights 66 and 68 and the dash light 70 flash on and off. When the driver makes a wide angle turn, a conventional mechanical device (not shown) coupled to the switch 64 automatically moves the switch from the L position to the off position. However, if the turn is not sufficiently wide, the turn signal indicator 64 remains activated and the lights 66, 68, and 70 continue to flash on and off. In accordance with this invention, the audio element 20 is also activated, providing the driver with an audio signal, alerting him that the turn signal indicator 64 is still activated even though he has made the turn. With the manually activated switch S1 moved to either the tone or delay positions, the circuit 24 is enabled. When the handle 65 is moved to activate the turn signal indicator 56 and the heater contacts 62 open, electricity flows through the circuit 24. The circuit 24 includes an oscillator circuit 25 and a time delay circuit 27.

The oscillator circuit 25 includes a resistor R3 connected in parallel with the transistor Q1, which has its base B connected to a resistor R4, with the outputs of the resistors R3 and R4 being connected to one side of the audio element 20 and the other side of the audio element being connected to the emitter E of the transistor Q1 and a resistor R5 which is connected to the switch S1. With the switch S1 in the tone position, a circuit is completed through the resistor R7, the L prong of the flasher relay 42, the turn signal switch 64 which is in the left turn position, and the filaments of the lights 66, 68, and 70 to the negative terminal of the battery.

The time delay circuit 27 includes the resistor R1, the variable resistor R2, and the resistor R6 which is in parallel connection to the capacitor C1 and the transistor Q2. Because of the design of the circuit 27, the volume of the audio alert signal gradually increases over time when in the delay mode. In the delay mode with the switch S1 moved to the delay position and the turn signal indicator 56 activated, the capacitor C1 begins to charge. When the charge on capacitor C1 reaches the threshold gate voltage of transistor Q2, this transistor starts to conduct, completing the circuit for the oscillator circuit 25. At this point the amplitude of the audio signal is low. As the charge on capacitor C1 increases, the drain source voltage of transistor Q2 decreases. This increases the voltage across the oscillator circuit 25 and increases audio signal amplitude. Typically a delay of 45 seconds to one minute occurs before any audible sound is generated. The resistance of R2 is adjusted to control this time delay. This delay period is suitable for most drivers. When the driver hears the audio signal, he then manually pushes the handle 65 to the off position. This will break the circuit which provides energy to the audio element 20 to shut off the turn signal alert device 10.

The following TABLE sets forth the characteristics or identifies the manufacturer of the major components of the

TABLE

| Component | Characteristic |
|---|---|
| Q1 | 2N3904 |
| Q2 | 2N7000 |
| R1 | 13 Megohms ± 5%, ¼ W |
| R2 | 1–2 Megohms ± 20%, ¾ W |
| R3 | 100 Kilohms ± 5%, ¼ W |
| R4 | 3 Kilohms ± 5%, ¼ W |
| R5 | 1 Kilohm ± 5%, ¼ W |
| R6 | 3.9 Megohms ± 5%, ¼ W |
| R7 | 15 Kilohms ± 5%, ¼ W |
| Audio Element 20 | Erie 7BB-35-3CAO |
| C1 | 10 Microfarad/25 volts |
| S1 | Augat, Single Pole Double |
| Throw, | MHS-123 |

SECOND EMBODIMENT OF THE INVENTION

Figure 8:
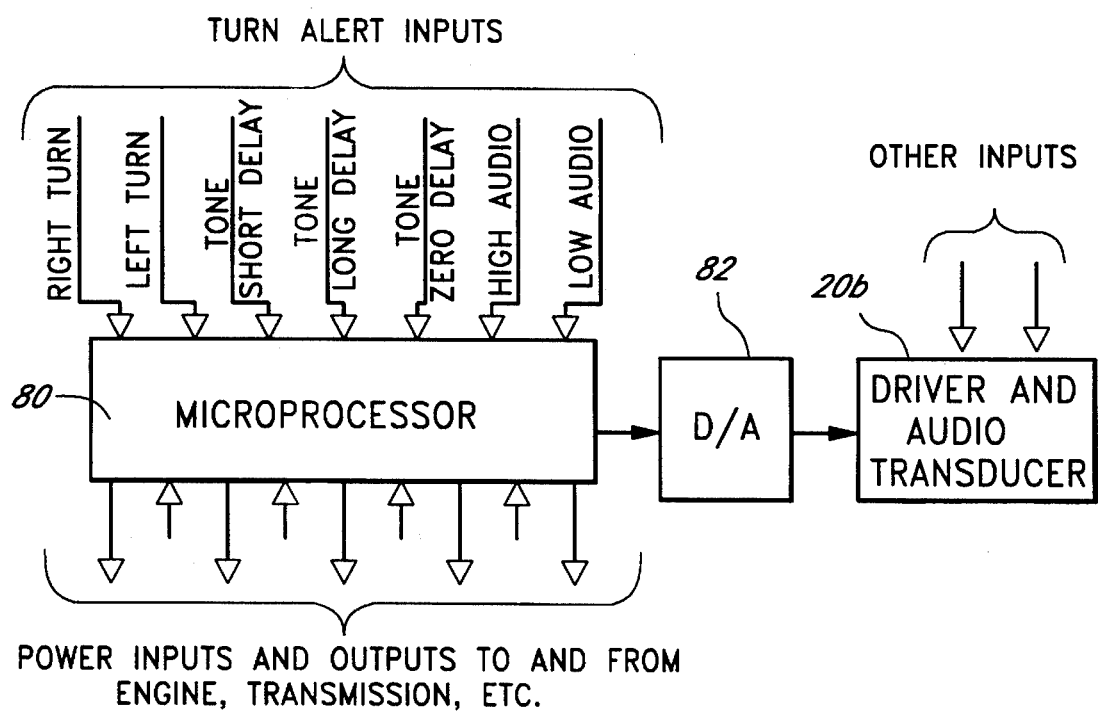
FIG. 8 is schematic circuit diagram showing the circuitry for an alternate embodiment of this invention where it is installed as original equipment on an automobile and connected to a microprocessor which turns on an audio transducer in the automobile.

The second embodiment of this invention is shown in FIG. 8 which incorporates a turn signal alert into the conventional control circuit of an automobile. Today's automobiles use several microprocessors to monitor and control various systems such as engine functions, transmission control, etc. There are also several audio elements available that provide audio signals when doors are open, seat belts are not fastened etc. One of the microprocessors conventionally employed in an automobile is identified in FIG. 8 by the numeral 80. Inputs are provided when the left or right turn signal indicator is manually activated by the driver moving the handle 65 up or down. Other inputs may be preset for short or long tone delay, no tone delay, high or low volume audio signal. These would be set according to the desires of the individual taste of the driver. A control element (not shown) on the handle 65 is utilized by the driver to set the time of the delay and the amplitude of the volume of the audio signal. When the handle 65 is actuated, a turn output signal would be generated by the microprocessor 80 and forwarded to a digital to analog converter 82, which provides an output signal to a standard audio element 20a used for providing audio alert signals. In accordance with conventional practice, a software engineer would program the microprocessor 80 to perform the necessary internal functions to generate the turn output signal in response to the drivers settings for volume and time delay and the and the position of the handle 65.

THIRD EMBODIMENT OF THE INVENTION

A manual reset switch S2 is another important feature of this invention. It allows the driver to reset the timing circuit to zero if the audio alert signal commences before a signalled turn is executed, as might occur while waiting for a traffic light to change.

Figure 9:
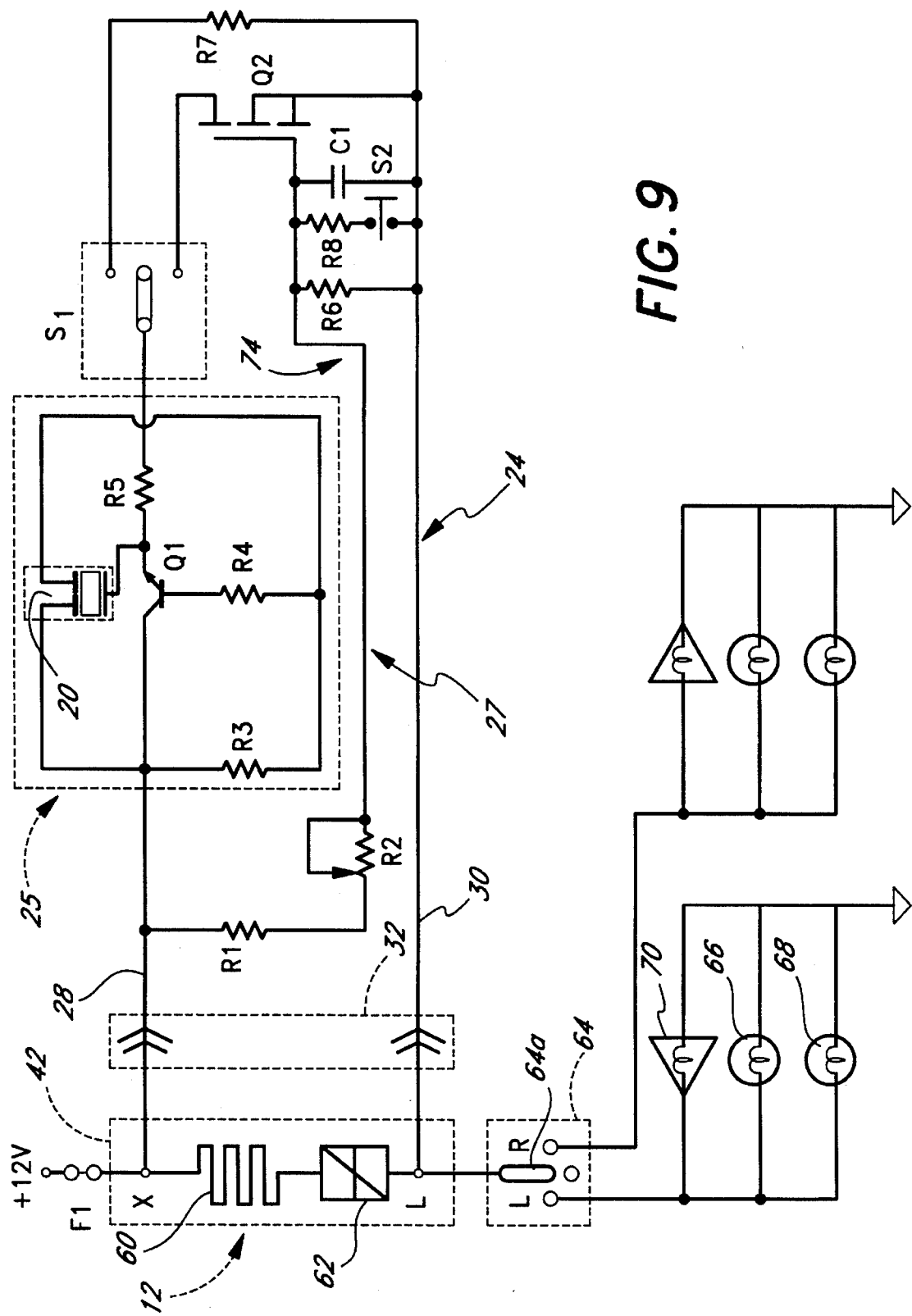
FIG. 9 is a schematic circuit diagram similar to that shown in FIG. 7, but modified to include a manual reset switch.

FIG. 9 shows an added resistor R8 and the momentary push switch S2 connected across the capacitor C1. When switch S2 is momentarily pushed on, capacitor C1 is rapidly discharged through resistor R8 and switch S2. This resets the time delay cycle for a further minute.

Figure 11:
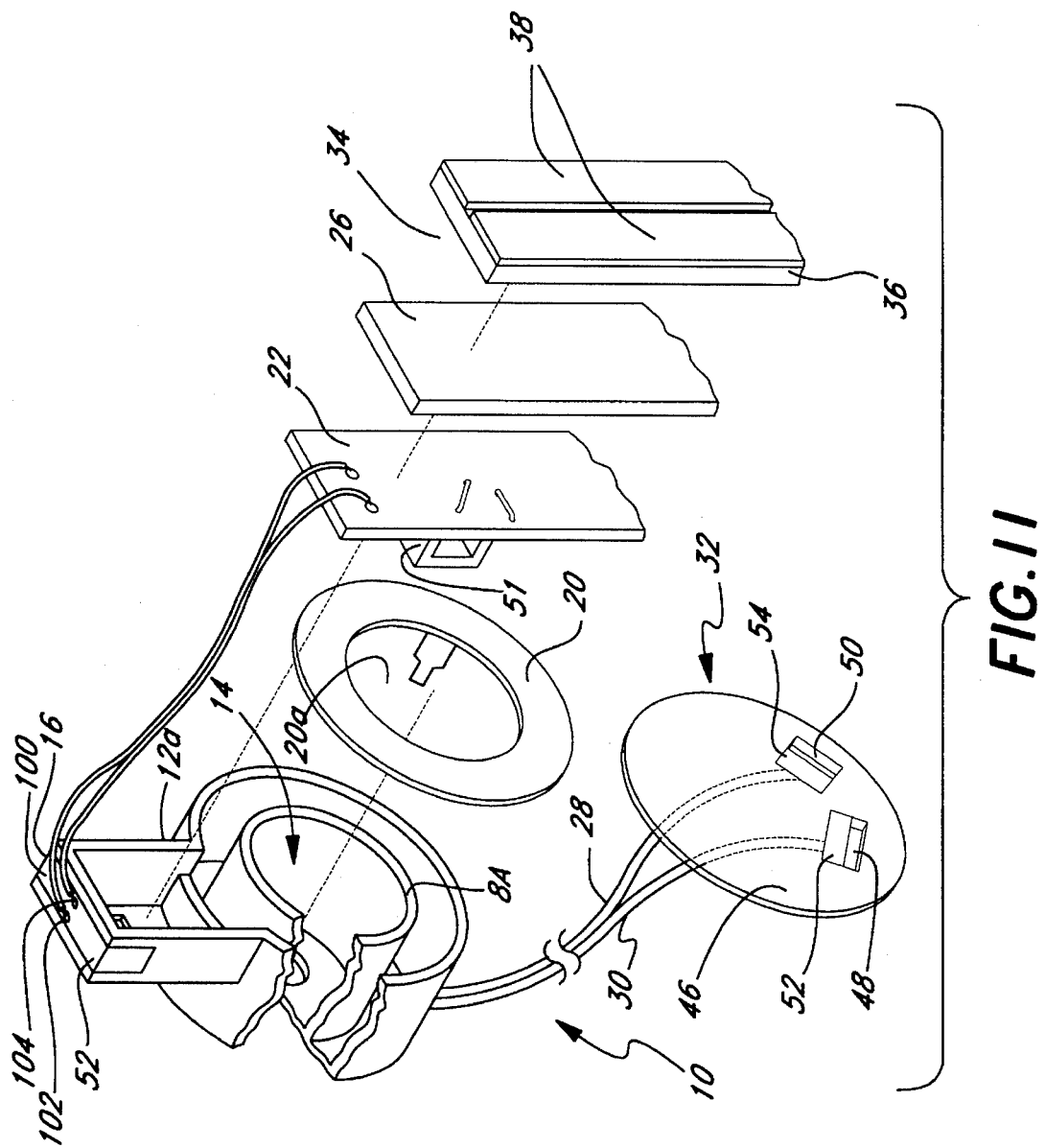
FIG. 11 is a perspective view of the alternate embodiment shown in FIGS. 9 and 10 illustrating the wiring connections for the reset switch.

FIGS. 10 and 11 show the mechanical construction of the switch S2. This switch S2 comprises a thin (0.005 in. thick) phosphor bronze metal bar 100 attached to the housing 12, leaving a gap of about 1/32 inch separating the bar from two eyelet contacts 102 and 104 (FIG. 11). When the driver pushes on the bar 100, it shorts the two contacts 102 and 104 of the switch S2. When the driver releases the bar 100, the bar springs back to its original position, leaving the switch S2 open.

FOURTH EMBODIMENT OF THE INVENTION

Figure 12:
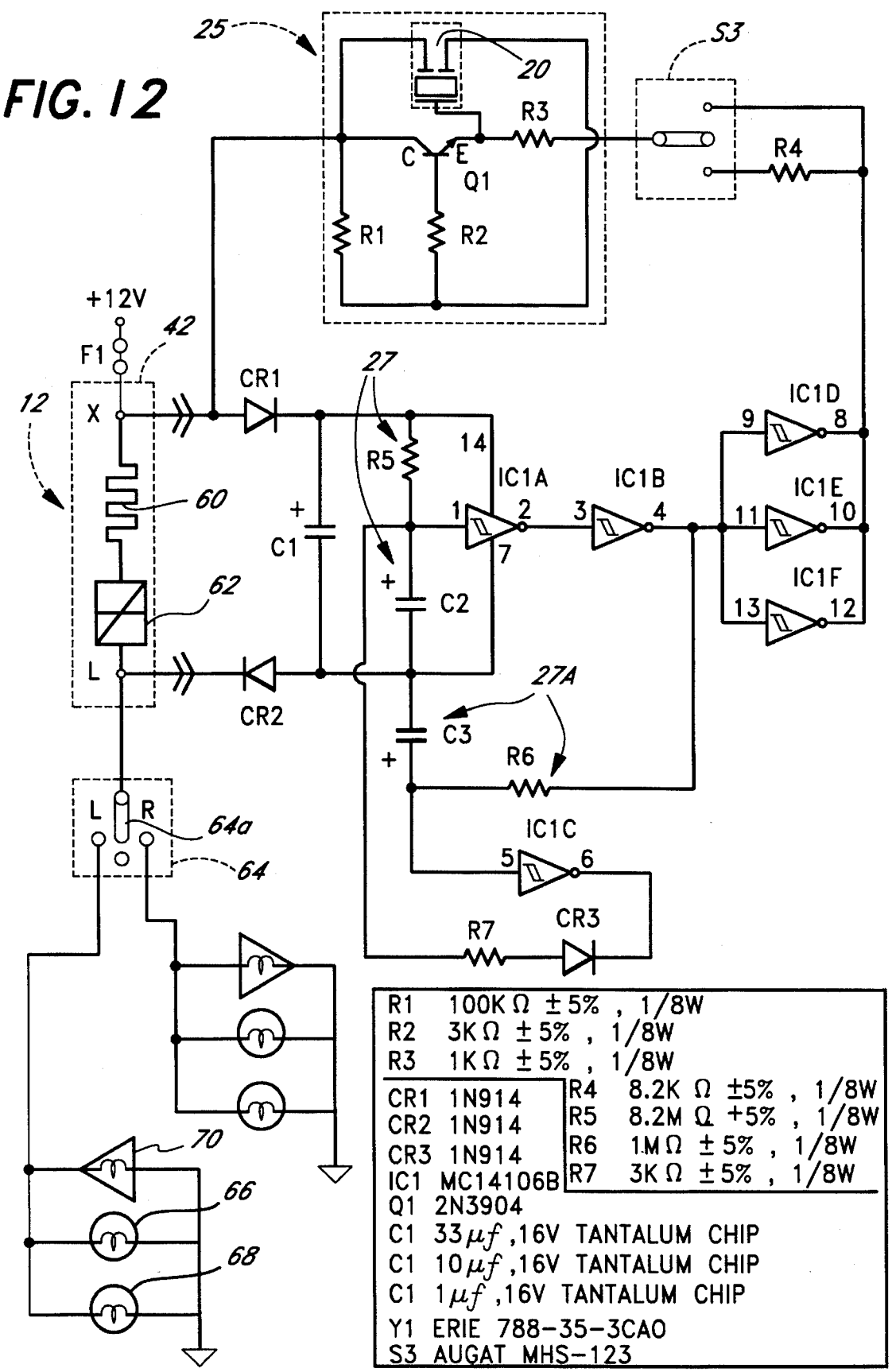
FIG. 12 is a circuit diagram similar to that shown in FIG. 7, but modified to include a time delay feature for the audio alert signal.

A novel circuit 150 illustrated in FIG. 12 provides an automatic time delay reset. This circuit 150 has been designed and packaged on the same size printed circuit board as the first embodiment of this invention. This circuit 150 generates an audio alert signal for two beeps (it can be designed for any number from one and up) after a one minute delay and repeats every minute until the turn signal switch 64 is turned off. A three position switch S3 controls the volume of the audio alert signal. This switch S3 has an "off" position, high level audio tone position, and low level audio tone position.

The heart of the circuit 150 is six Schmitt Triggers identified as IC1A, IC1B, IC1C, IC1D, IC1E and IC1F, embodied in a CMOS integrated circuit, such as an MC14106B sold by Motorola. Other equivalents manufactured by leading semiconductor companies around the world could also be used. The Schmitt trigger circuit has the desirable feature of hysteresis. It triggers on a set threshold voltage and switches off at a voltage less than the threshold voltage, thus preventing undesired on and off switching around the threshold value.

With the manually activated switch S3 moved to either the Hi or Lo position, the circuit 150 is enabled. When the handle 65 is moved to activate the turn signal indicator 56, and when the flasher relay contacts 62 open, electricity flows through the circuit 150. The circuit 150 includes an oscillator circuit 25, time delay networks 27 and 27A, and the Schmitt Triggers IC1A, IC1B, IC1C, IC1D, IC1E and IC1F in the integrated circuit.

The oscillator circuit 25 includes a resistor R1 connected in parallel with transistor Q1, which has its base B connected to a resistor R2, with the outputs of resistors R1 and R2 being connected to one side of the transducer 20 and the other side of the transducer being connected to the emitter E of the transistor Q1, and a resistor R3, which is connected to the switch S1. With the switch S3 in the Hi or Lo position, and the turn signal switch 64 selected to the left turn position, a circuit is completed from the 12V battery, through the fuse F1, through the circuit 150, when the flasher relay 42 contacts 62 are open, through the turn signal switch 64 which is in the left turn position, and the filaments of the lights 66, 68, and 70 to the negative terminal of the battery. When the flasher relay 42 contacts 62 are closed, circuit 150 is shorted out and current flows from the battery, through the fuse F1, through the flasher heater 60 and relay contacts 62, through the turn signal switch 64, which is in the left turn position, and the filaments of the lamps 66, 68, and 70, to the negative terminal of the battery.

During the first operating cycle of the flasher relay 42, when the contacts 62 are open, the capacitor C1, rapidly charges to the battery voltage through diodes CR1 and CR2. Diodes CR1 and CR2 prevent discharging of capacitor C1 and capacitor C2 when the flasher relay 42 contacts 62 close during each cycle of operation. Capacitor C2 starts charging through resistor R5 at the same time as capacitor C1 receives its charge and continues to charge for a period of one minute (design time), at which time the voltage on capacitor C2 has reached the threshold switching level of Schmitt Trigger IC1A. IC1A then switches on. The voltage at pin 2 goes low, and the output of IC1B pin 4 goes high, turning on Schmitt Triggers IC1D, IC1E, and IC1F. Pins 8, 10, and 12 are now low (approximately zero volts), providing a sink for the current of oscillator circuit 25, which now generates an audio output via the audio transducer element 20 each time the flasher relay 42 contacts 62 open. Audio signals generated as a series of "beeps" continue to be produced until capacitor C2 is discharged. This occurs when the voltage on capacitor C3, which started charging through resistor R6 from IC1B pin 4 when IC1A was triggered, reaches the switching level of Schmitt Trigger IC1C. IC1C pin 6 then goes low, supplying a sink for rapidly discharging capacitor C2 through resistor R7 and diode CR3. Diode CR3 isolates the output of IC1C from capacitor C2 when its output at pin 6 is high. With capacitor C2 discharged, Schmitt Trigger IC1A pin 2 goes high, IC1B pin 4 goes low, IC1C pin 6 goes high, and IC1D, IC1E, and IC1F turn off, thus turning off the oscillator circuit 25 and preventing further audio alert signals from being generated. The one minute time delay continues to repeat itself until the turn signal switch 64 is turned off by the driver or by the vehicle's automatic mechanism, if so equipped. When turn signal switch 64 is turned off, capacitor C1 quickly discharges through the Schmitt Triggers. When switch S3 is in the Hi position, maximum audio power is generated. When switch S3 is in the Lo position, a lower power audio signal is generated, governed by the value of resistor R4.

FIFTH EMBODIMENT OF THE INVENTION

As shown in FIGS. 12, 13, and 14, instead of the wafer connector 32, a pair of metal, eye-lid connectors 160 and 162 are used. These connectors 160 and 162 are thin, approximately 1/64 inch thick, about the same thickness as the wafer connector 32. The flasher relay prongs 42a slide through slots 166 and 168, respectively in connectors 160 and 162. The connectors 160 and 162 are metal, and are connected to the wires going to the turn signal alert device 10. These connectors 160 and 162 are more versatile than the wafer connector 32 in that they will fit all flasher relays, are economical, and just as easy for installation. One method of constructing the connectors 160 and 162 is simply to punched them out of approximately 1/64 inch thick brass sheet.

SIXTH EMBODIMENT OF THE INVENTION

Figure 15:
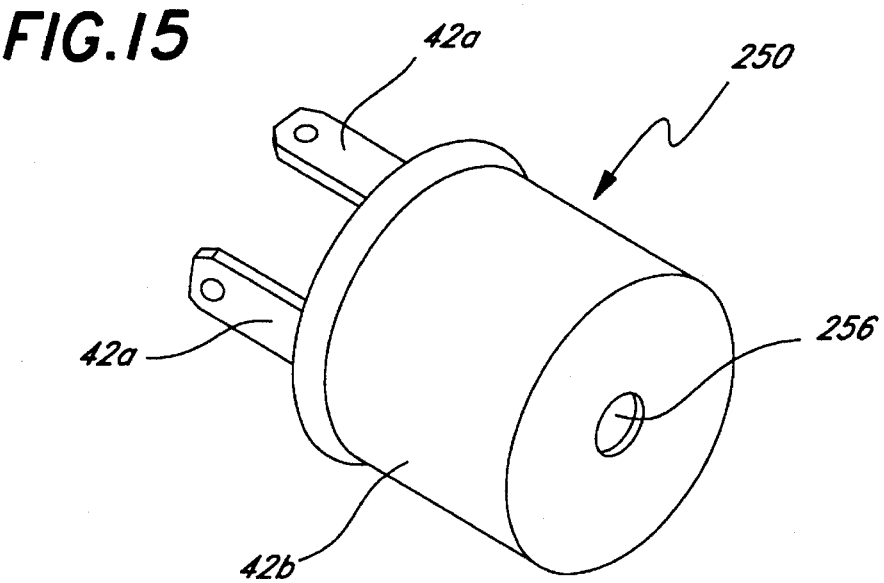
FIG. 15 is an alternate embodiment of this invention employing a combined solid state relay and alert signal device.
Figure 16:
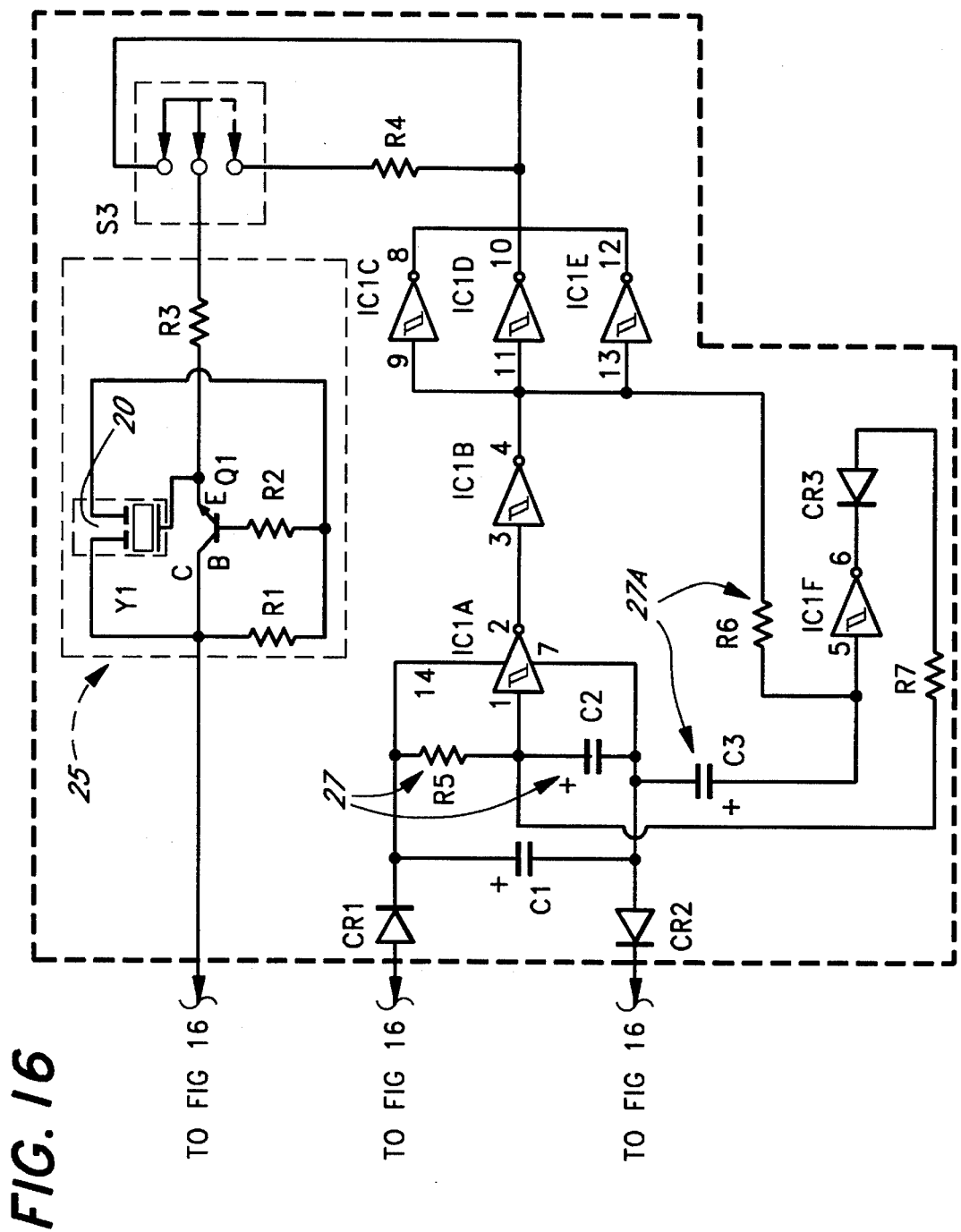
FIG. 16 is a circuit diagram similar to that shown in FIG. 12, but modified to include an oscillator/switch circuit. The control circuit, including the audio element, is mounted within the housing of the device shown in FIGS. 15 and 15A.
Figure 16:
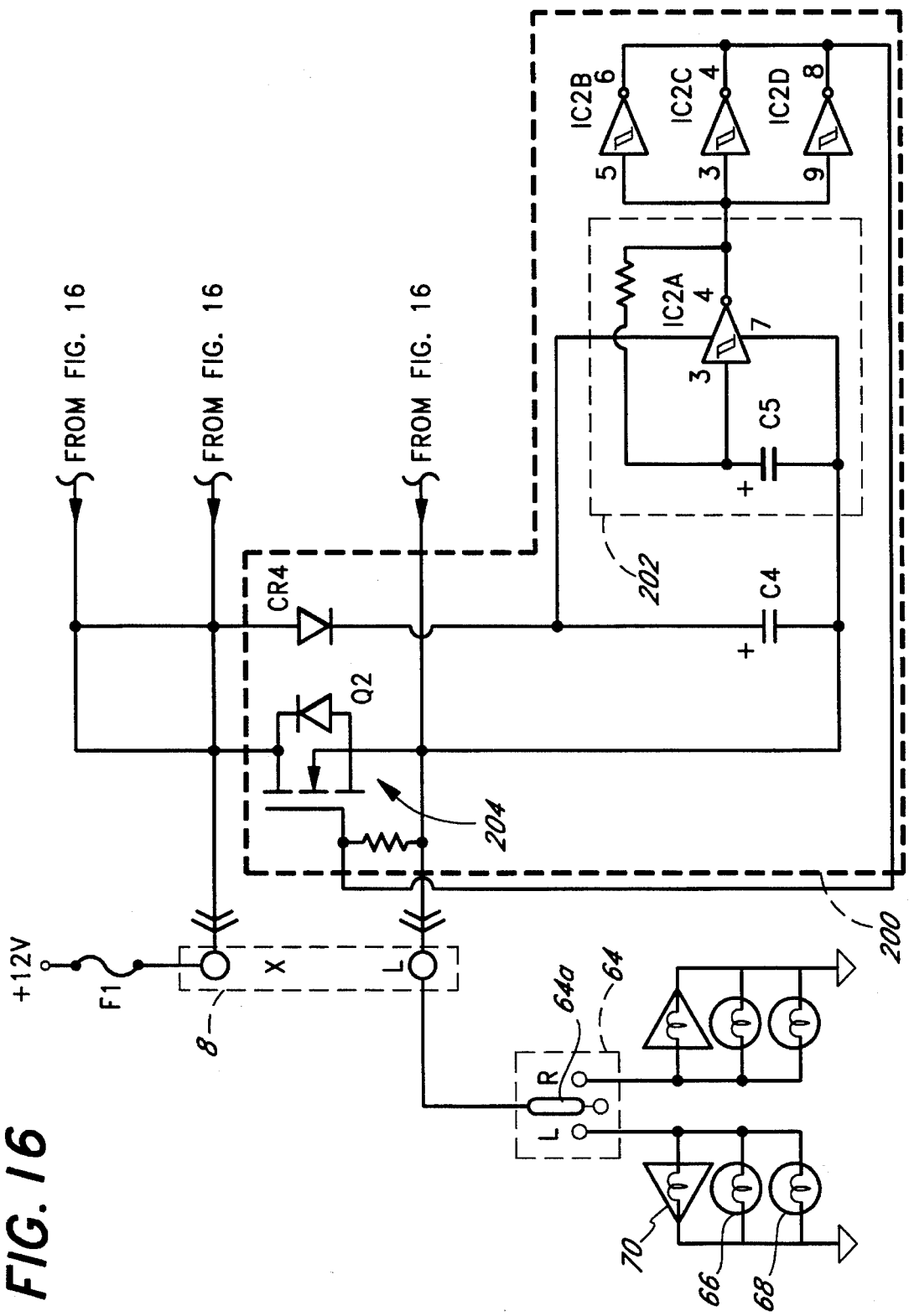

As illustrated in FIGS. 15 and 16, the sixth embodiment of this invention, device 250, utilizes a modified flasher relay 42 which encloses within its housing 42b the audio transducer element 20 (FIG. 16) and circuit 150 (FIG. 16). This sixth embodiment also employs an oscillator/switch circuit 200 (FIG. 16) which is a substitute for the heater element 60 and contact 62. This oscillator/switch circuit 200 is also enclosed within the housing 42b. Thus, a compact and easy to install device 250 is provided.

Figure 15A:
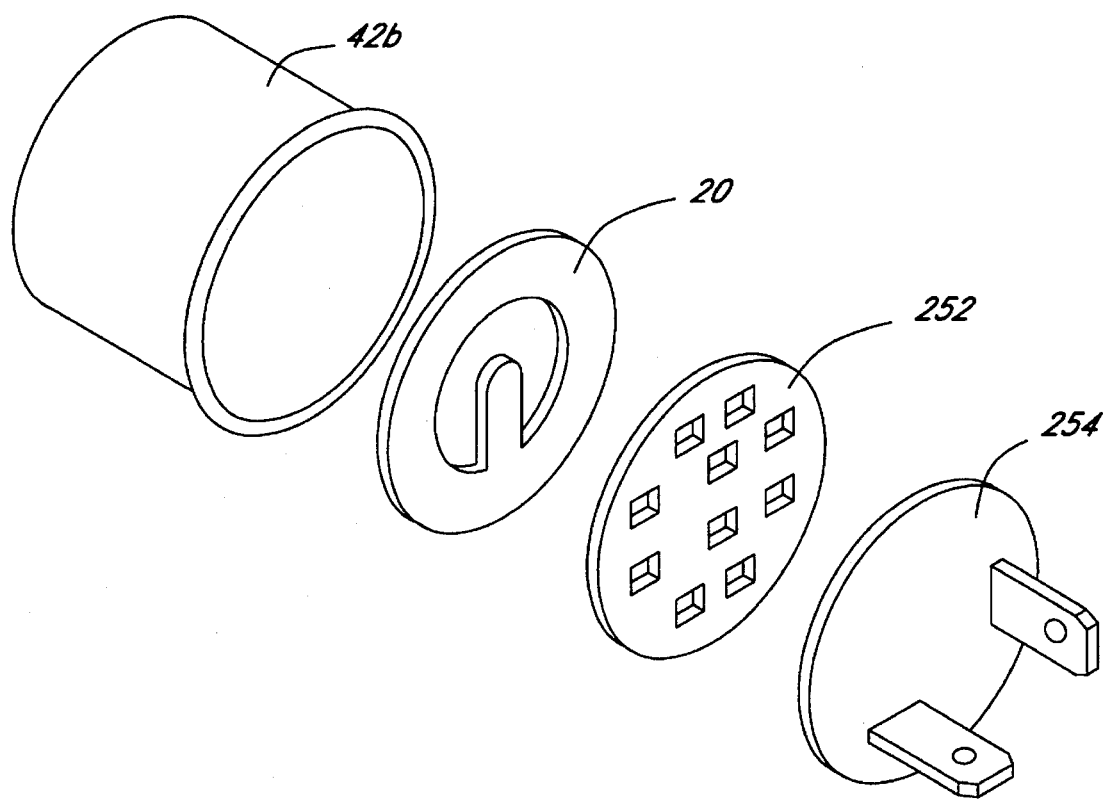
FIG. 15A an exploded perspective view of the embodiment of this invention shown in FIG. 15.

The device 250 has an outer appearance almost identical to that of the conventional flasher relay 42, and prongs 42a which are received in a receptacle 58. The main difference in appearance is the result of an aperture 256 in the top of the housing 42b. The aperture 256 facilitates passage of sound waves from the housing 42b. As depicted in FIG. 15A, mounted within the housing 42b is the audio transducer element 20, a circuit board 252 using surface mounted components on both sides of the board 252, and a bottom cover 254 from which the prongs 42a extend outward. On the inside (not shown) of the cover 254 is mounted a switch 204 (FIG. 16). These components are assembled in the conventional manner.

As best illustrate in FIG. 16, an oscillator/switch circuit 200 turns the lights 66 and 68 on and off as long as the switch arm 64a engages the L contact of the auto turn signal switch 64. The right hand lights are operated in a similar manner.

The oscillator/switch circuit 200 includes a low frequency oscillator 202 and a solid state switch 204. The oscillator 202 comprises an integrated circuit IC2A, resistor R8, and capacitor C5. This oscillator oscillates at a frequency of 2 Hertz. Integrated circuit IC2B, integrated circuit IC2C, and integrated circuit IC2D isolate the oscillator 202 from the switch 204 and provide the necessary drive for this switch 204. The switch 204 comprises MOS FET transistor Q2 and resistor R9. Transistor Q2 switches on and off at 2 hertz when enabled by the turn signal handle 65, which activates the switch arm 64a of the turn signal indicator 56. A diode CR4 couples the DC power source to the oscillator 202 by charging a capacitor C4 when the switch arm 64a contacts either the L or R contact of the auto turn signal switch 64. The diode CR4 prevents the capacitor C4 from discharging through the switch 204 when this switch 204 is turned on.

To operate this sixth embodiment, the user activates the switch arm 64a, for example engaging contact L, to close a circuit including the circuits 150 and 200. The oscillator 202 in conjunction with the switch 204 causes the lights 66 and 68 to flash on and off. After a predetermine time period, the circuit 150 activates the audio signal as described previously. When the switch arm 64a is moved to the off position, the circuits 150 and 200 are disabled.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

I claim:

1. A device which provides an audio alert signal to indicate when a light in an automotive turn signal indicator is flashing on and off, said indicator including a battery with positive and negative terminals and a relay for controlling the flashing that has an input connected to one terminal and an output connected to one side of the light through a manually activated switch which is closed to indicate turning, the other side of the light being connected to the other battery terminal so that the light flashes on and off when the switch is closed, said device comprising a connector having an input and an output to be connected across the relay, with the input of the device electrically coupled to the input of the relay and the output of the device electrically connected to the output of the relay, an audio element having an input connected to the input of the connector and an output connected to the output of the connector to thereby couple the output of the audio element to the light when the switch is activated, said audio element providing an audio signal which increases from a low to high volume gradually over time, and a delay element which delays activation of the audio element for a predetermined time period.

2. The device of claim 1 wherein the relay includes a plurality of prong members extending outwardly therefrom which connect into a control circuit for the light, and the connector means comprises
a thin insulator element having therein openings which receive the prong members, and
conductive elements at said openings which contact the prong members when said prong members are inserted into the openings.

3. The device of claim 1 including a control switch for switching the device between a delayed mode and an audio active mode of operation.

4. The device of claim 1 including a housing which holds a circuit board to which the audio element is attached, said housing having means for securing said housing at a position near the relay.

5. The device of claim 1 including a manual reset means for resetting the delay means.

6. The device of claim 1 including an eye-lid type connector for connecting the device to the relay.

7. A device which provides an audio alert signal to indicate when a turn signal indicator of an automobile is activated, comprising a connector to make electrical connection with a flasher relay in a control circuit for the turn signal indicator, said connector being attached to the flasher relay by plugging and unplugging the flasher relay in said circuit, and an audio element having an input connected to one side of the flasher relay and an output connected to the other side of the flasher relay to connect the audio element to the turn signal indicator, said audio element providing an audio signal which increases from a low to high volume gradually over time, and a delay element which delays activation of the audio element for a predetermined time period.

8. In an automobile having a turn signal indicator and an audio element which provides an audio alert signal having an adjustable amplitude indicating that the turn signal indicator is activated, a microprocessor for controlling the operation of the audio element, said microprocessor having an input at which a signal is provided when the turn signal indicator is activated, said microprocessor providing a control signal to turn on the audio element when said microprocessor receives said signal indicating that the turn signal indicator has been activated, with said microprocessor being programmable by a driver to set said adjustable amplitude of the audio alert signal.

9. In an automobile having a turn signal indicator and an audio element which provides an audio alert signal indicating that the turn signal indicator is activated, a microprocessor for controlling the operation of the audio element, said microprocessor having an input at which a signal is provided when the turn signal indicator is activated, said microprocessor providing a control signal to turn on the audio element when said microprocessor receives said signal indicating that the turn signal indicator has been activated, with said microprocessor being programmable by a driver so that the audio alert signal is turned on after a predetermined time has elapsed.

10. A device which provides an audio alert signal to indicate when a light in an automotive turn signal indicator is flashing on and off, said indicator including a battery with positive and negative terminals and a relay for controlling the flashing that has an input connected to one terminal and an output connected to one side of the light through a manually activated switch which is closed to indicate turning, the other side of the light being connected to the other battery terminal so that the light flashes on and off when the switch is closed, said device comprising a connector having an input and an output to be connected across the relay, with the input of the device electrically coupled to the input of the relay and the output of the device electrically connected to the output of the relay, an audio element having an input connected to the input of the connector means and an output connected to the output of the connector means to thereby couple the output of the audio element to the light when the switch is activated, and a delay element which provides a predetermined time period between a series of audio alert signals until the manually activated switch is deactivated.

11. A combined relay and audio alert signal device for an automotive vehicle, including a housing with connector elements that enable the device to plug into a circuit including a manually activated switch which is closed to indicate turning of an automotive vehicle by activation of flashing lights on the vehicle and a battery terminal of a battery which provides electrical power to the flashing lights, and mounted within the housing
an audio element,
a solid state power switch for controlling the flashing of the lights, and
an electronic control circuit connected to the audio element and said solid state power switch,
said control circuit, when the manually activated switch is activated, turning said relay on and off and turning on the audio element after a predetermined time delay.

* * * * *